United States Patent [19]

Bartholic et al.

[11] Patent Number: 5,389,236
[45] Date of Patent: Feb. 14, 1995

[54] METHOD AND APPARATUS FOR CONTROLLING INTRODUCTION OF CATALYSTS INTO FCC UNITS

[76] Inventors: David B. Bartholic, 75 Wetumpka La., Watchung, N.J. 07060; Regis B. Lippert, 210 Baltimore Blvd., Sea Girt, N.J. 08750

[21] Appl. No.: 50,865

[22] Filed: Apr. 21, 1993

[51] Int. Cl.⁶ ............................................. C10G 13/18
[52] U.S. Cl. .................... 208/152; 208/120; 208/DIG. 1; 364/500; 364/502
[58] Field of Search ............ 208/152, DIG. 1, 120; 364/500, 502

[56] References Cited

U.S. PATENT DOCUMENTS

| | | | |
|---|---|---|---|
| 2,916,441 | 12/1959 | Kruse, Jr. et al. | 208/152 |
| 3,175,968 | 6/1961 | Berger | 208/164 |
| 3,213,014 | 10/1965 | Atkinson et al. | 208/DIG. 1 |
| 3,294,675 | 12/1966 | Adams et al. | 208/152 |
| 3,316,322 | 4/1967 | Glahn | 208/DIG. 1 |
| 3,591,783 | 2/1969 | Zumwalt | 364/500 |
| 3,614,682 | 10/1971 | Smith | 208/DIG. 1 |
| 3,621,217 | 11/1971 | Carr et al. | 208/DIG. 1 |
| 3,629,097 | 1/1970 | Smith | 208/DIG. 1 |
| 3,687,841 | 8/1972 | Saxton et al. | 208/DIG. 1 |
| 3,753,893 | 8/1973 | Lee et al. | 208/DIG. 1 |
| 4,018,671 | 4/1977 | Andon et al. | 208/152 |
| 4,062,761 | 12/1977 | Lukenbach | 208/DIG. 1 |
| 4,082,513 | 4/1978 | Andon | 23/288 |
| 4,092,722 | 5/1978 | Hofferber et al. | 364/500 |
| 4,187,548 | 2/1980 | Gross et al. | 364/500 |
| 4,345,993 | 8/1982 | Stewart | 208/DIG. 1 |
| 4,371,499 | 2/1983 | Bard et al. | 364/500 |
| 4,374,750 | 2/1983 | Vickers et al. | 208/DIG. 1 |
| 4,434,245 | 2/1984 | Lomas et al. | 364/500 |
| 4,439,533 | 3/1984 | Lomas et al. | 364/500 |
| 4,560,815 | 12/1985 | Agarwal | 208/DIG. 1 |
| 4,650,566 | 3/1987 | Buyan et al. | 208/DIG. 1 |
| 4,750,989 | 6/1988 | Soderberg | 208/DIG. 1 |
| 4,840,726 | 6/1989 | Wakefield | 208/152 |
| 4,902,407 | 2/1990 | Chan et al. | 208/152 |
| 5,215,653 | 6/1993 | Nelson et al. | 208/DIG. 1 |

*Primary Examiner*—Helane Myers
*Attorney, Agent, or Firm*—Dorr, Carson, Sloan & Peterson

[57] ABSTRACT

The disclosed method and apparatus provides for providing addition of micro-spheroidal ("MS") Fluid Catalytic Cracking ("FCC") catalyst additives and/or bulk catalyst to an in situ circulating, active catalyst inventory of a fluid catalytic cracking unit at times and rates precisely controlled to sustain an effective additive concentration. In a preferred version of this invention, each of a series of such apparatus comprising one such device for each catalyst additive, is operated on a basic cycle time length during a portion of which the unit is engaged in active addition while in the remainder of the time it is passive.

24 Claims, 1 Drawing Sheet

METHOD AND APPARATUS FOR CONTROLLING INTRODUCTION OF CATALYSTS INTO FCC UNITS

BACKGROUND OF THE INVENTION

1. Field of the Invention

This invention generally relates to methods and apparatus for controlling introduction of catalysts and/or catalyst additives into fluid catalytic cracking units (FCC units). Such introduction methods and apparatus are used to control the production of various primary and secondary products in a wide variety of catalytic reactions.

2. Description of the Prior Art

Fluid catalytic cracking processes are employed throughout the chemical and petrochemical industries. The need to constantly adjust such processes can be engendered by any number of unavoidable changes, e.g. changes necessitated by variations in: (1) the character of a feedstock, (2) more stringent pollution control mandates and/or (3) changed product quality requirements. The ability to closely adjust or otherwise control such processes also serves to minimize the use of, and hence the costs of, expensive catalysts and/or catalyst additive materials. Such control also serves to reduce the complexities associated with the often competing effects associated with the simultaneous use of several different kinds of catalyst materials.

In order to better appreciate the nature of the herein disclosed methods for introducing catalyst materials into a FCC unit, one first should envision its operation. Typically, a catalyst bulk inventory of tons, indeed even hundreds of tons, of catalyst materials flow (often at high velocities) through the fluidized beds, reaction zones, and regeneration zones which make up the unit. Next, it should be appreciated that several distinct kinds of catalyst may be distributed, preferably to a steady-state condition of homogeneity, in a circulating bulk catalyst. Each different catalyst species will, however, diffuse through the bulk catalyst mass and gradually be deactivated, attritted and elutriated at its own individual rate. For the most part these rates are determined by the hardness, durability, and density characteristics of each respective catalyst species. Each catalyst also contributes to a delay time which is such that, at some optimum rate and allowable composition, the overall bulk catalyst composition settles down to a continuous rhythm of steady-state performance with respect to introduction of each catalyst material, much as a human being will reach a fairly constant average level of medication by ingestion of fixed dosages of different drugs taken at fixed times.

Bulk catalyst blends often contain a major fraction of a primary catalyst and a minor fraction of one or more catalyst additive materials. It is also common practice to place more than one catalyst species in a single catalyst particle. In their more complex forms, individual catalyst particles are usually comprised of an inert matrix or binder material which serves to hold two or more different catalyst species together in a single overall binder/catalyst matrix. Nonetheless, for the most part, a given FCC function is normally accomplished through the use of a given catalyst species. In other words, a specific catalyst species is normally used to catalyze a given type of catalytic reaction regardless of whether or not a given catalyst particle contains a single catalyst species or more than one catalyst species.

Those skilled in this art also will appreciate that most catalysts used in FCC units are made in the form of so-called microspheroidal particles (MS particles). Such particles are specifically designed to be placed in a "fluidized state" by entraining them in high velocity vapor streams. Consequently, catalyst particles which are to be placed in a fluidized state must conform to rather narrow ranges of particle size and density limitations which are necessary to achieve fluidization.

By way of further explanation of the context in which this invention resides, it also should be noted that a typical FCC unit is normally operated with a view toward simultaneously attaining and maintaining several, performance parameters. For example, a petroleum refining FCC unit may be called upon to convert a petroleum feedstock into gasoline of a given octane rating while simultaneously holding production of a pollutant such as $SO_x$ to a prescribed level. In this case the petroleum cracking function is carried out by a bulk catalyst while the $SO_x$ control function is accomplished through the use of a so-called catalyst additive material. Other common performance parameters which an operator may wish to control in a petroleum FCC unit might include (but not be limited to) product yield(s), coke lay down (coke deposit on the catalyst) and gas make (control of the nature and relative proportions of chemical components of the end products—with a particular view toward avoiding or limiting production ethane, ethylene and hydrogen. The attainment of each such performance parameter also may be thought of as a function being performed by the FCC unit. It also should be noted that a given catalytic function being performed by a FCC unit may be a secondary, or even undesirable, function. In many, if not most, catalytic cracking processes, a bulk catalyst will be used to carry out a primary function (e.g., production of gasoline from a petroleum feedstock) while a catalyst "additive" is simultaneously used to carry out a secondary function (e.g., reduce $SO_x$ emissions).

It also should be noted in passing that it will very often be the goal of the methods taught by this patent disclosure to inject a catalyst additive into a FCC unit in a manner calculated to maintain a given concentration of the additive in the unit in order to control fluctuation in the FCC unit's performance with respect to some function (e.g., $SO_x$ production) to some prescribed level or range. To a large extent, the introduction of catalyst additives in order to attain and maintain desired concentrations of given catalysts has been through the use of rather imprecise —indeed, even haphazard—methods. For example, bulk catalyst suppliers may simply add certain catalytic additive(s) to their bulk or primary catalyst products in order to satisfy their customer's catalyst additive needs. At best, this practice represents an unwelcome diversion from the bulk catalyst supplier's business since the bulk catalyst ingredient(s) normally represents most (e.g., 80-99%) of most bulk catalyst/catalyst additive products.

It also should be noted that a typical catalyst additive material is usually much more expensive than a typical bulk catalyst. Hence, addition of a catalyst additive to a bulk catalyst usually increases the costs of the overall product. These added cost considerations also are amplified by the fact that a bulk catalyst supplier is usually forced to add much more of a given additive to a bulk catalyst/additive mixture than is normally required by the FCC operator since it is imperative that the overall catalyst material be able to perform in a wide range of operating circumstances. For example, it is well known that consumption of most catalyst additive materials can vary considerably with relatively small changes in the quality of a petroleum feedstock, e.g., small changes in its content of sulfur, heavy metal contaminants, etc. Consequently, given an expectation of some changes in the character of a given feedstock, a bulk catalyst supplier will usually "overdose" a given bulk catalyst with each catalyst additive placed in the bulk catalyst.

Unfortunately, such overdosing practices can sometimes create undesired fluctuations in a FCC unit's performance with respect to other catalytic function being carried out by the bulk catalyst and/or by a different species of catalyst additive. Consequently, many FCC operators prefer to introduce catalyst additives at the FCC unit according to their more particular local needs. Those skilled in this art also will appreciate that bulk catalysts are often better added on a more or less "continuous" basis, while catalyst additives tend to be needed on an "intermittent" basis. That is to say that, even though it might seem that it would be best to simply introduce each catalyst additive species continuously along with the bulk catalyst at a known rate in order to maintain the additive's relative proportion in the overall bulk catalyst, this is not usually the way such processes are carried out. In the real world of "cat cracking" such constancy is rarely achieved and, in many cases, is not even desired.

Consequently, a variety of procedures and mechanical systems for "on-site" addition of fresh catalyst materials to FCC units have been tried with varying degrees of success. Some of the problems which heretofore have been experienced with such on-site catalyst additive introduction procedures and/or apparatus follow from the fact that most prior art catalyst introduction systems which are employed to introduce catalyst additives utilize large segments of the mechanical systems which are normally used to introduce the bulk catalyst material into the FCC unit. For example, the apparatus most commonly employed for addition of catalyst additives to FCC units are those so-called "lift pipe" systems which are normally used to carry relatively large quantities of bulk catalyst from a storage hopper to a FCC unit in a high velocity stream of air in which the catalyst particles are entrained. Other less common, but still technically viable, catalyst additive introduction systems are based upon use of such varied devices as "star" type feeders, addition pots and pinch valves. A wide assortment of "home made" systems also are found throughout the chemical and petrochemical industries. Their use is often brought about by frustration with the use of existing bulk catalyst addition systems for the purpose of introducing catalyst additive materials.

There are several reasons why the systems used to introduce bulk catalyst are not well suited to the introduction of catalyst additives. For one thing, bulk catalysts usually are introduced in large amounts, often on a continuous basis, while catalyst additives are usually introduced in much smaller amounts, usually on an intermittent basis. Moreover, and regardless of the relative amounts of catalyst being delivered, the amount of catalyst introduced by such addition systems is "inferred" by the length of time an air stream is allowed to carry a catalyst material—regardless of its identity. That is to say that, regardless of whether or not a bulk catalyst material or a catalyst additive is being handled, a clocked metering device is used to control an air stream according to some predetermined time schedule. Certain other problems follow from the fact that delivery of catalyst additives to the FCC unit usually takes place via a lift pipe which is permanently "sized" with a view toward continuously delivering relatively large amounts of bulk catalyst. This circumstance often creates large errors when the bulk catalyst delivery system is called upon to transfer relatively small amounts of catalyst additives to a FCC unit—especially on an intermittent basis.

In either case, however, an FCC operator simply will assume that operation of the air stream which entrains catalyst particles (of whatever type), for a given period of time, will carry a given amount of catalyst particles to the FCC unit. For example, an operator might assume that an air stream, at a given pressure (e.g., 50 psi) will deliver a given amount of catalyst through a given sized lift pipe at a given delivery rate (e.g., 4 tons per hour). Thus, a timer system and/or a human operator will assume that operation of the catalyst delivery air stream, for a given period of time (e.g., one-quarter of an hour), will deliver a given amount of catalyst in a given period of time (e.g., $\frac{1}{4}$ hr.$\times$4 tons/hr.=1 ton, delivered in 15 minutes). Unfortunately, such precise delivery does not always take place in the "real world" of catalytic cracking, especially when a lift pipe which was originally sized to deliver say 40 tons of bulk catalyst per hour, on a continuous basis, is also called upon to deliver a catalyst additive at a much lower rate of say only 4 tons per hour on an intermittent basis.

Aside from the inappropriate sizing of the equipment, errors also are frequently produced by the fact that a plant's air supply system may, and often does, operate over a widerange of pressures, e.g. an "assumed" 50 psi air supply may, in fact, operate at pressures ranging from say 40 to 60 psi at any given point in time. Such pressure differences will cause the system to deliver differing amounts of catalysts in a given time period. Any errors resulting from such differences in pressure become more pronounced in the case of introducing relatively small amounts of catalyst additive on an intermediate basis. Thus, for any or all of the reasons noted above, and even though a given catalyst delivery system may operate for a precisely measured period of time (e.g., 15 minutes), a prescribed amount of catalyst (e.g., the 1 ton "assumed" to be delivered in the 15 minutes of our previous example) may not, in fact, be delivered to a FCC unit. Thus, under the influence of such unintended, undetected and/or cumulative operating errors, an FCC function which is being controlled by a given catalyst or catalyst additive eventually will operate outside a prescribed range with respect to some desired condition or performance level (e.g., $SO_x$ production, octane rating of gasoline, etc.) even though the feedstock is of a uniform quality. Obviously, changes in feedstock quality will serve to compound the effects of all such errors.

Those skilled in this art also will appreciate that many prior art methods for controlling introduction of catalyst additives are by no means "automatic". Indeed, many catalyst addition systems must be continuously monitored and controlled by FCC operations personnel even though the catalyst addition systems are placed on a mechanical timer which adds a nominal volume of fresh catalyst according to a predetermined schedule. Some catalyst addition control systems simply operate until the errors in the addition of the catalyst accumulate to a point where the FCC unit begins to operate beyond a given performance level, e.g., until it produces too much $SO_x$, too little gasoline of a given quality, too much coke and so on. At such a point the board operator will "override" operation of a metered catalyst addition system and "manually" introduce or withhold catalyst additive until the operation of the FCC unit is brought back to some desired performance level with respect to a given performance parameter being controlled by a particular catalyst. Those skilled in this art also will appreciate that such responses by means of changes in catalyst addition rates are by no means instantaneous, indeed for larger FCC units several hours may be needed to effect such changes.

It also should be noted in passing that, when such manual intervention occurs, the all too "human tendency" for an FCC operator is to add much more of a given catalyst additive than is actually prescribed to correct a problem. The operator often "overreacts" in order to get through his work shift without any further problems. However, the operator also has to pay a price with respect to such overdosing practices since the overdosing of one catalyst component of a bulk catalyst may itself create competing demands or problems which cause frequent and sometimes severe distractions from the operator's other duties. Thus, for all of the above-noted reasons, there exists a need for improved methods and apparatus for introducing catalyst materials into FCC units.

SUMMARY OF THE INVENTION

In response to these problems, applicant has developed the herein described methods (and apparatus) for delivering catalyst materials, and especially catalyst additives, to FCC units. This invention carries out a variety of catalyst addition tasks by introducing catalyst materials according to schedules that are calculated to maintain a desired catalyst concentration level in the bulk catalyst of a FCC unit over long periods of time (e.g., days or even weeks and months). The attainment of such desired concentration levels is achieved through the combined use of certain hereinafter described catalyst introduction schedules which are aided by catalyst quantity verification procedures which are based upon the weight of catalyst taken from a hopper rather than the period of time an air stream carries catalyst from the hopper to the FCC unit. Taken together, these schedule and quantity verification procedures produce much more accurate, and hence more useful, catalyst dosages than those delivered through use of the "assumptions" made with respect to operation of air streams for given periods of time.

The herein described processes and/or apparatus are generally applicable to the addition of any fluidizable solid particles, not just catalyst additives. That is to say that even though the processes and apparatus of this invention are particularly well suited to the task of introducing relatively small amounts (e.g., 1 to 1,000 pounds per hour±1.0%) of accurately measured catalyst additive materials, these processes and apparatus can be used to deliver large amounts (e.g., 40 tons/hr.) of virtually any particulate material which is capable of being "fluidized." Thus, for the purposes of this patent disclosure, the term "catalyst" should be taken to include any catalyst additive, bulk catalyst—and even catalytically inert particles—so long as the material is capable of being placed in a fluid state in an FCC unit. It should also be noted that, for the purpose of this patent disclosure (including the wording of the claims of this patent application), the terms "fluid catalytic cracking unit" "FCC unit" "reactor" and the like should be taken to include the catalyst regenerators or other equipment normally associated with such FCC units.

Next, it should be noted that the herein described methods are intended to introduce catalyst materials according to a predetermined "tailor made" schedule for each catalyst ingredient. To these ends, applicant's methods and apparatus, most preferably, are based upon use of a separate catalyst addition system for each distinct catalyst species introduced into the unit. This need for separate catalyst addition apparatus for each catalyst species follows from the fact that the amount of each such catalyst species which is "assumed" to be delivered by the herein described processes must be individually checked with respect to the amount of catalyst actually taken from the catalyst hopper and delivered to the FCC unit. In effect, the amount of catalyst assumed to be delivered is continuously checked against the weight of the catalyst taken from the catalyst hopper. The herein disclosed processes also will operate according to a predetermined catalyst addition schedule until and unless that predetermined schedule is: (1) automatically altered by a change in the FCC unit's performance (e.g., the FCC unit's performance with respect to $SO_x$ production causes a computer program to introduce more $SO_x$ catalyst in order to correct a problem), (2) altered by an operator who actively and voluntarily preempts or intervenes in the catalyst addition process by keying digital information into a computer associated with applicant's apparatus or (3) the operator intervenes into the process by manually turning valves, etc.

The benefits of the herein described methods follow in large part from the fact that the quantities of all previously scheduled, newly scheduled and manually introduced catalyst materials can be quickly checked for accuracy on a weight basis rather than relying on the previously noted quantity "assumptions" associated with the use of plant air/metering clock systems. This accuracy also enables a computer to make more effective changes in a catalyst addition schedule which is not producing a desired effect in a FCC unit. In any case, the accuracy of applicant's catalyst addition methods is repeatedly checked against the actual weight of the catalyst introduced into a FCC unit on each occasion of catalyst introduction. That is to say that applicant's methods are based upon a precise knowledge of the weight of the catalyst actually introduced into the FCC unit—over a given, and relatively long, period of time—as opposed to the amount of catalyst "assumed" to be delivered via an air stream which operates for a given period of time. This accuracy is accomplished by the act of weighing the container which holds the catalyst material which is to be fed into the FCC unit. Hence, each catalyst species is most preferably kept in its own separate weighing container. Preferably, a weighing will take place before and after each dose or assumed amount of catalyst additive is sent to the FCC unit. In other words, applicant's process continually checks the accuracy of the amount of catalyst assumed to be introduced into the FCC unit by an air stream flowing for a given period of time against a weighed amount of catalyst which is determined by weighing the catalyst container. A computer memory device associated with the herein described apparatus, most preferably, will be programmed to record and store information concerning the amount and time of each instance of introduction of a given catalyst material.

It might again be emphasized that under some embodiments of applicant's overall process, the scheduled introduction of a given catalyst may be overridden in response to either: (1) information concerning the functioning of the FCC unit which is automatically provided to a computer memory device associated with applicant's apparatus by input of analog information generated by feed-back signals from the FCC refining unit, (2) by operator intervention into the process through the use of digital information which an operator keys into a computer control system associated with the herein described apparatus or (3) by manual intervention, e.g., by operating valves, etc. by hand. That is to say that the herein disclosed methods also are based upon the fact that, while operation within certain performance limits will be the original object of applicant's processes, any transgression beyond certain predetermined FCC performance limits (however they are sensed and/or signaled) may serve to signal a condition for which a more (or less) intensive program of corrective, catalyst introduction is initiated by automatic (e.g., via a computer program) implementation of a new catalyst addition regime or by manual intervention. Through the use of known computer control systems, such changes in the quantity of catalyst added may be made "automatically" (i.e., without operator intervention) or manually. In other words, applicant's normal or primary addition schedule will typically be backed up by a secondary addition schedule which also is prescheduled and preprogrammed to provide an "override" of the predetermined, primary automatic catalyst introduction schedule and further backed up by an alarm system which may signal the need for manual intervention into the catalyst addition process. Again, the secondary addition schedule will, in effect, modify the primary schedule until a desired FCC performance level is attained or restored or until an operator intervenes in the automatic addition procedure. For example, a secondary addition schedule may involve the use of an increased quantity of $SO_x$ catalyst introduced automatically for the next one, two, three, etc. catalyst addition events or cycles in order to correct a $SO_x$ emission problem. Thereafter, use of the increased amount of $SO_x$ catalyst can be maintained as part of a new catalyst introduction regime or the catalyst addition program may call for a return to the use of the amount of $SO_x$ catalyst originally scheduled.

Control over an FCC unit operating according to the general teachings of this patent disclosure will be achieved through only addition of (or withholding of) a particular catalyst additive to solve a particular problem i.e., the system will receive and react to information signals from the overall process only by contributing (or withholding) a particular catalyst additive to the bulk catalyst mass to solve a particular problem or meet a particular FCC catalyst requirement. In other words, in the most preferred embodiments of these processes, there will be no active participation in any process modifications other than through the act of adding or withholding a particular catalyst. To further this limited end, applicant's catalyst addition systems, most preferably, will operate in response to analog signals received from the FCC unit's control panel, rather than operate from signals taken directly from the FCC unit itself via probes, sensors, analyzers, etc.

Employment of the methods and apparatus of this patent disclosure will normally begin with a gathering of certain hereinafter described operating data from a given FCC unit. Generally speaking, for a given feedstock used in operating a given FCC unit at a prescribed level of cracking severity (higher cracking severities are provided by higher temperatures and/or lower pressures), applicant's evaluation process will commence with a taking of a series of successive (e.g., every ½ hr.) samples from the FCC unit's total bulk catalyst. The bulk catalyst will then be analyzed with respect to the use of any, some, or every separate catalyst material being used in the FCC process e.g., the samples might be analyzed on the basis of changes in their weight percentages or concentrations over time with respect to the weight of the FCC unit's bulk catalyst. Such a sequence of analyses then can be used to determine the rate of loss, consumption or attrition $R_{att}$ of each catalyst component (e.g., expressed in tons/hr) of the bulk catalyst. Such information will, among other things, enable the designer of applicant's process to "size" the proposed catalyst introduction system at a size which will guarantee introduction of catalyst into the FCC unit under the herein described processes at an addition rate $R_{add}$ which is faster than the attrition rate $R_{att}$ at which the FCC unit consumes each catalyst material. Indeed, under the herein described methods, applicant's catalyst introduction system most preferably will be designed to introduce catalyst materials into the FCC unit at a rate from about 3 to about 10 times the consumption rate $R_{att}$ for any given catalyst material by that FCC unit. Applicant has found that this sizing requirement allows the herein described systems to "rest" rather than operate continuously without experiencing unacceptable variation in the concentration of most catalyst materials in a wide variety of catalytic processes.

After determining a given catalyst's specific consumption rate in a particular FCC unit, the next step in applicant's process is to determine a minimum amount, percentage or concentration $C_{min}$ and a maximum amount, percentage or concentration $C_{max}$ of that particular catalyst in the bulk catalyst for a desired performance level with respect to some function being performed by the FCC unit (e.g., gasoline production, $SO_x$ level, etc.). Such maximum and minimum levels can be determined by overdosing or withholding catalyst from the FCC unit under otherwise controlled conditions of operation. These determinations also can include a determination of a desired average amount and/or percentage concentration $C_{av}$ of that catalyst. Preferably, the difference between the desired average concentration $C_{av}$ and the minimum concentration $C_{min}$ of any given catalyst can be such that when the difference between these two concentrations is doubled it will produce the desired maximum concentration $C_{max}$ of that catalyst. In effect, such studies will establish a desired or optimal "addition amount" which, when added to a minimum amount, gives the maximum amount or percentage and a total permissible variation for a particular catalyst material in that particular FCC unit.

As will be seen in a moment, this consumption rate, maximum concentration and minimum concentration data can then be used to determine a time period which applicant choose to call a "basic cycle time". This basic cycle time is used to establish (by engineering calculations and/or computer programs) a regular schedule of introduction for a particular catalyst ingredient in a FCC unit being used for a given FCC task. To this end, a convenient period of time such as an eight hour work shift, a twenty-four hour day, etc., will be broken into a series of basic cycle times for each catalyst ingredient. Each basic cycle time, in turn, will be divided into a period (or periods) in which a catalyst ingredient is introduced into the FCC unit and a period (or periods) in which that catalyst ingredient is not introduced into the unit. That is to say that during a given basic cycle time, which we might designate as $T_0$, one part of the basic cycle time period (e.g., a first time period $T_1$) is occupied by addition of the catalyst while the remaining time $T_2$ of the basic cycle time $T_0$ is characterized by the fact that none of that particular catalyst is introduced into the unit. Thus, the basic cycle time $T_0$ for that catalyst ingredient will equal the addition time $T_1$ plus the non-addition time $T_2$, i.e., $T_0 = T_1 + T_2$.

Next, it should be noted that the addition time $T_1$ for a calibrated lift pipe system can be made analogous to an addition amount (that is to say the time $T_1$ may be made analogous to an assumed weight of the catalyst), through the use of a timed metering apparatus. In applicant's process, however, the apparatus includes a device for accurately weighing the amount of catalyst actually introduced in a given basic cycle time $T_0$. Preferably, the computer memory associated with the apparatus will store information concerning the weight of catalyst introduced regardless of whether the introduction was the result of an automatic introduction or, a secondary, corrective introduction or manual introduction. Again, if catalyst addition takes place at an addition rate $R_{add}$ which depends on an assumed air pressure (and a known time period) of the catalyst delivery system, there can be undetected errors in the amount of catalyst actually delivered to the FCC unit. On the other hand, in the herein described process, the amounts of catalyst actually delivered can be repeatedly, indeed, if need be, constantly, verified by accurately weighing the amount of catalyst transferred from the catalyst hopper to the FCC unit. Again, this inherently more accurate data then can be stored in a computer memory device and/or used as data in a computer program to establish an even more effective catalyst introduction scheme. Similarly, such data also can be used to establish a more accurate maximum concentration $C_{max}$ and the minimum concentration $C_{min}$ levels.

One can construct various mathematical relationships which serve to define a first or primary schedule of introduction for the catalyst for applicant's process. For example, knowing that catalyst addition takes place at a lift pipe addition rate or rate of addition $R_{add}$ less the attrition rate $R_{att}$, one can establish a net addition rate, $R_{net}$ for each catalyst species, e.g., the net addition rate, $R_{net}$ will equal the rate of catalyst addition, $R_{add}$ less the rate of catalyst attrition, $R_{att}$ (i.e., $R_{net} = R_{add} - R_{att}$). Similar computations also can relate the maximum and minimum catalyst concentration levels to certain rates of change in the catalyst concentration. For example, since the maximum concentration $C_{max}$ equals the minimum concentration $C_{min}$ plus the net addition rate $R_{net}$ multiplied by the time $T_1$ that the catalyst is added, i.e., $C_{max} = C_{min} + R_{net} \times T_1$, $T_1$ can readily be determined. In the same vein, since loss of catalyst occurs at a known loss rate $R_{att}$, $T_2$ can be determined from the equation $C_{max} = R_{att} \times T_2 + C_{min}$.

A more specific example may help clarify the statements and equations just given. Suppose, for example, that the following information were known about a given FCC unit:

(1) Its total catalyst inventory is equal to 100 tons.
(2) The "desired" "optimum" average content $C_{av}$ of addition catalyst X is equal to 10% of the bulk catalyst (i.e., of the 100 tons of bulk catalyst, preferably an average of 10 tons of it should be additive catalyst X).
(3) The minimum allowable concentration $C_{min}$ of catalyst additive X equals 9% of the bulk catalyst (i.e., at least 9 tons of the 100 ton bulk inventory should be addition catalyst X).
(4) The maximum allowable concentration $C_{max}$ equals 11% (i.e., no more than 11 tons of the 100 ton bulk inventory should be addition catalyst X).
(5) The known rate of consumption $C_{att}$ of catalyst X equals 1 ton/hr.
(6) The lift pipe rate or addition rate $R_{add}$ of catalyst X equals 4 tons/hr.

Hence, by inserting these known values into the following equations, an individual or computer program can determine an initial or primary schedule for the introduction of catalyst X.

| | | |
|---|---|---|
| $C_{max}$ | = | $(C_{av} - C_{min}) \times 2 + C_{min}$ |
| | = | $(10 - 9) \times 2 + 9$ |
| | = | 11 tons |
| $R_{net}$ | = | $R_{add} - R_{loss}$ |
| | = | $4 - 1$ |
| | = | 3 tons/hr. |
| $C_{max}$ (11) | = | $C_{min} + R_{net} \times T_1$ |
| | = | $9 + 3 \times T_1$ |
| $T_1$ | = | $\tfrac{2}{3}$ hrs = 40 min. |
| $C_{min}$ (9) | = | $C_{max} - R_{att} \times T_2$ |
| | = | $11 - 1 \times T_2$ |
| $T_2$ | = | 2 hrs. |
| Basic Cycle $T_0$ | = | $T_1 + T_2$ |
| | = | $\tfrac{2}{3}$ hr. + 2 hr. |
| | = | 2 hr. 40 min. |

Thus, this FCC unit will be programmed to operate according to an initial schedule or regime wherein a basic time of two hours and forty minutes is established over some convenient time period such as a twenty-four hour day. Each basic cycle time is broken into a period of 40 minutes in which catalyst is introduced, followed by a period of two hours wherein no catalyst is introduced. The convenient period (e.g., a 24 hour day) will thus consist of a series of basic uniform cycle times (perhaps ending with a fraction or part of a basic cycle time period). During the 40 minute catalyst addition period, one ton of catalyst will be introduced into the FCC unit. This regime will be continued until $C_{max}$ becomes greater than 11 tons or $C_{min}$ becomes less than 9 tons. If the $C_{max}$ or $C_{min}$ limits are exceeded, a new or secondary programmed addition schedule can be implemented. Such new schedules could be implemented in a time period originally covered by the basic time period in which the $C_{max}$ or $C_{min}$ limit is exceeded, but in some of the more preferred embodiments of this process such changes in the catalyst introduction regime will be made in one or more subsequent basic cycle time periods of the originally scheduled catalyst introduction regime. For example, a new or secondary schedule might call for more catalyst X to be introduced in the next 1, 2, 3, etc. basic cycle times (e.g., the original 1 ton/hr addition amount might be increased to 2/tons/hr, but still delivered in the same two hour and 40 minute basic cycle time, i.e., $T_1$ could be lengthened from 40 minutes to 80 minutes and $T_2$ shortened from 2 hours (120 minutes) to 80 minutes. Thereafter, the system might revert to the original 1 ton/hr. schedule for delivery in the original 40 minute $T_1$ period; or a computer program could permanently institute some new addition schedule based upon the revised catalyst use experience. By way of further example, the new program might call for a 2 ton/hr. addition schedule if the original 1 ton/hr. schedule causes the $C_{min}$ to be exceeded in a certain number of successive basic cycle times. In the alternative, an entirely new basic cycle time period might replace the original two hour and forty minute basic cycle time period.

Expressed in patent claim terminology, applicant's method for controlling addition of a catalyst into a fluid catalytic cracking unit (FCC unit) in order to maintain a given concentration of the catalyst in said FCC unit and thereby produce a desired performance from said FCC unit will generally comprise the following steps: (I) obtaining data concerning the fluid catalytic cracking unit in order to establish: (1) an upper concentration limit for the catalyst which is capable of producing the desired performance from the FCC unit, (2) a lower concentration limit for the catalyst which is capable of producing the desired performance from the FCC unit, (3) a rate of consumption of the catalyst by the FCC unit, and (4) an addition rate at which catalyst is introduced into the FCC unit; (II) entering the data concerning the FCC unit into a programmed computer in order to determine: (1) a basic cycle time for introducing an addition amount of the catalyst into the FCC unit, (2) a first period of the basic cycle time wherein the addition amount of the catalyst is introduced into the FCC unit, (3) a second period of the basic cycle time wherein the catalyst is not introduced into the FCC unit, (4) an addition amount of the catalyst which is capable of raising the concentration of the catalyst from the lower concentration limit to the upper concentration limit and which also is capable of being introduced into the FCC unit during the first period of the basic cycle time, given the addition rate at which catalyst is introduced into the FCC unit, (III) placing the FCC unit under control of a computerized control device and thereby: (1) operating the FCC unit for a given period of time which contains a series of basic cycle times, (2) introducing a nominal addition amount of the catalyst (having a nominal weight) into the FCC unit during the first period of a given basic cycle time by injecting said catalyst into the FCC unit at an addition rate which is between about three times and about ten times the rate of consumption of the catalyst by said FCC unit, (3) determining a weight difference between the nominal weight of the nominal addition amount and an actual weight of the catalyst introduced into the FCC unit by weighing a container holding an inventory of the catalyst before and after the nominal addition amount is introduced into the FCC unit, and (4) sending analog information concerning the weight difference between the nominal weight of the nominal addition amount and the actual weight of the catalyst introduced into the FCC unit as determined by weighing the container holding the inventory of the catalyst to the computerized control device in order to take any needed corrective action with respect to subsequent introduction of the catalyst into the FCC unit.

Another preferred method for controlling addition of a catalyst into a fluid catalytic cracking unit (FCC unit) in order to maintain a given concentration of the catalyst in said FCC unit and thereby produce a desired performance from said FCC unit will comprise: (I) obtaining data concerning the fluid catalytic cracking unit in order to establish: (1) an upper concentration limit for the catalyst which is capable of producing the desired performance from the FCC unit, (2) a lower concentration limit for the catalyst which is capable of producing the desired performance from the FCC unit, (3) a rate of consumption of the catalyst by the FCC unit, and (4) an addition rate at which catalyst is introduced into the FCC unit; (II) entering the data concerning the FCC unit into a programmed computer in order to determine: (1) a basic cycle time for introducing an addition amount of the catalyst into the FCC unit, (2) a first period of the basic cycle time wherein the addition amount of the catalyst is introduced into the FCC unit, (3) a second period of the basic cycle time wherein the catalyst is not introduced into the FCC unit, (4) an optimal addition amount of the catalyst which is capable of raising the concentration of the catalyst from the lower concentration limit to the upper concentration limit and which also is capable of being introduced into the FCC unit during the first period of the basic cycle time, given the addition rate at which catalyst is introduced into the FCC unit, and (5) a non-optimal addition amount of the catalyst which is capable of changing the concentration of the catalyst in the FCC unit in response to an analog signal produced by the FCC unit when said FCC unit does not produce the desired performance through use of the optimal addition amount of the catalyst; (III) placing the FCC unit under control of a computerized control device and thereby: (1) operating the FCC unit for a given period of time which contains a series of basic cycle times, (2) introducing an optimal addition amount of the catalyst additive into the FCC unit during the first period of a given basic cycle time by injecting said catalyst additive into the FCC unit at an addition rate which is between about three times and about ten times the rate of consumption of the catalyst by said FCC unit, (3) determining that an optimal addition amount of the catalyst is, in fact, introduced into the FCC unit during the first period of the given basic cycle time by use of a determination method which includes weighing a container holding an inventory of catalyst additive before and after said catalyst is introduced into the FCC unit, (4) sending analog information obtained by weighing the container holding the inventory of catalyst additive to the computerized control device in order to evaluate corrective action with respect to subsequent introduction of catalyst additive into the FCC unit, and (5) taking corrective action by a procedure wherein a non-optimal addition amount of the catalyst is introduced into the FCC unit during a subsequent basic cycle time by virtue of the fact that an analog signal produced by the FCC unit causes the computerized control device to substitute use of the optimal addition amount of the catalyst with the use of the non-optimal addition amount of the catalyst.

The method for controlling addition of a catalyst into a fluid catalytic cracking unit (FCC unit) in order to maintain a given concentration of the catalyst in said FCC unit and thereby produce a desired performance from said FCC unit, might also comprise: (I) obtaining data concerning the fluid catalytic cracking unit in order to establish: (1) an upper concentration limit for the catalyst which is capable of producing the desired performance from the FCC unit, (2) a lower concentration limit for the catalyst which is capable of producing the desired performance from the FCC unit, (3) a rate of consumption of the catalyst by the FCC unit, and (4) an addition rate at which catalyst is introduced into the FCC unit; (II) entering the data concerning the FCC unit into a programmed computer in order to determine: (1) a basic cycle time for introducing an addition amount of the catalyst into the FCC unit, (2) a first period of the basic cycle time wherein the addition amount of the catalyst is introduced into the FCC unit, (3) a second period of the basic cycle time wherein the catalyst is not introduced into the FCC unit, (4) an optimal addition amount of the catalyst which is capable of raising the concentration of the catalyst from the lower concentration limit to the upper concentration limit and which also is capable of being introduced into the FCC unit during the first period of the basic cycle time, given the addition rate at which catalyst is introduced into the FCC unit, and (5) a non-optimal addition amount of the catalyst which is capable of changing the concentration of the catalyst in the FCC unit in response to an analog signal produced by the FCC unit when said unit does not produce the desired performance through use of the optimal addition amount of the catalyst; (III) placing the FCC unit under control of a computerized control device and thereby: (1) operating the FCC unit for a given period of time which contains a series of basic cycle times, (2) introducing an optimal addition amount of the catalyst (having a nominal weight) into the FCC unit during the first period of a given basic cycle time by injecting said catalyst additive into the FCC unit at an addition rate which is between about three times and about ten times the rate of consumption of the catalyst additive by said FCC unit, (3) determining a weight difference between the nominal weight of the optimal addition amount and an actual weight of the catalyst introduced into the FCC unit by weighing a container holding an inventory of the catalyst additive before and after the optimal addition amount is introduced into the FCC unit, (4) sending analog information concerning a weight difference between the nominal weight of the optimal addition amount and the actual weight of the catalyst additive introduced into the FCC unit to the computerized control device in order to evaluate corrective action with respect to subsequent introduction of catalyst additive into the FCC unit, and (5) taking corrective action by a procedure wherein a non-optimal addition amount of the catalyst is introduced into the FCC unit during a subsequent basic cycle time by virtue of the fact that an analog signal produced by the FCC unit causes the computerized control device to substitute use of the optimal addition amount of the catalyst with use of the non-optimal addition amount of the catalyst.

Even more preferred embodiments of any of the above-noted methods for introducing catalyst may include: (1) corrective action which includes introducing, during a subsequent basic cycle time, an amount of the catalyst which is greater than the addition amount, (2) corrective action which includes introducing, during a subsequent basic cycle time, an amount of the catalyst which is less than the addition amount, (3) corrective action which includes extending the duration of the first period and shortening the duration of the second period of the given basic cycle time in order to introduce catalyst into the FCC unit during the given basic cycle time in an amount which is greater than the addition amount, (4) corrective action which includes returning to use of the addition amount of the catalyst in a basic cycle time subsequent to a basic cycle time in which the corrective action is taken, (5) corrective action which includes continued use of an amount of the catalyst which is different from the addition amount in each basic cycle time period remaining in the given period of time, (6) use of a corrective action which includes production of an alarm to alert an operator of the FCC unit.

Moreover, since the methods and apparatus of this patent disclosure are intended to be, as much as possible, "automatic" the apparatus and methods of this patent disclosure will comprise computer means well known to the art and means for detecting signals generated by performance parameters of said FCC unit (e.g., $SO_x$ production). Those skilled in this art will appreciate that such performance parameters might be measured directly or indirectly by empirical relationships (e.g., the measurement of temperature to infer gas make and so forth). The signals generated by these measurements could be sent directly to the herein disclosed apparatus, but as was previously noted, most preferably, such signals will be sent to the FCC unit's control board from whence they are relayed to the computer device which controls applicant's overall catalyst addition system. That is to say that applicant's device preferably receives input data from the FCC control board rather than from sensors in the FCC unit itself.

DESCRIPTION OF THE PREFERRED EMBODIMENTS

Figure 1:
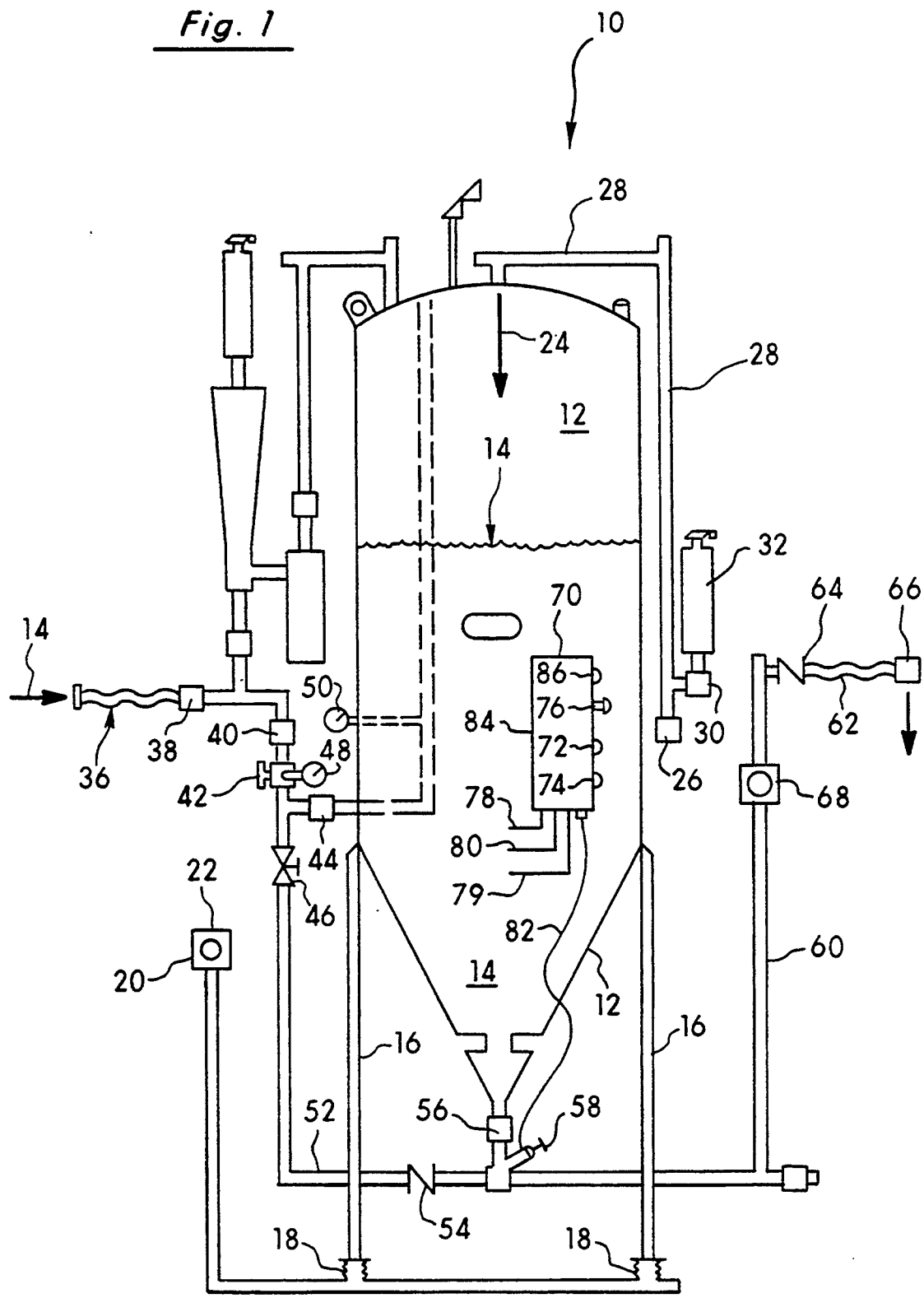
FIG. 1 is an apparatus and flow diagram of a preferred apparatus for carrying out the processes of this patent disclosure.

FIG. 1 depicts a catalyst addition apparatus 10 adapted to carry out the processes of this patent disclosure. A suitably sized and shaped weigh hopper 12 contains an inventory of catalyst material 14. A support system 16 for the weigh hopper 12 is provided with a weighing device 18 such as load cells or scales. The weighing device 18 is preferably connected to a weigh indicator 20 such as a digital display 22. In effect, the weighing device 18 weighs both the weigh hopper 12 and the catalyst inventory 14 contained in said hopper. The weigh indicator 20 can be adapted to display the combined weight of the weigh hopper 12 and catalyst inventory 14. In the alternative, the empty weight of the weigh hopper 12 can be automatically subtracted from the combined weight of the weigh hopper 12 and catalyst inventory 14 so that a read-out display 22 of the weigh indicator 20 shows only the weight of the catalyst inventory 14. In either case, the weighing device 18 will detect changes in the weight of the catalyst inventory 14 over time as catalyst is taken from the weigh hopper 12 and added to a FCC unit not shown in FIG. 1.

In one preferred embodiment of this invention, fresh catalyst from a source not shown in FIG. 1 is added to the catalyst inventory 14 via a hopper loading valve 26 and catalyst injection pipe 28. The catalyst injection pipe 28 might also serve as a hopper venting system through the use of an appropriate hopper vent valve 30 (which is preferably equipped with a silencer device 32).

Plant air 34 is delivered to the catalyst addition apparatus 10 via an air conduit system 36 such as the flexible hose and pipe system depicted in FIG. 1. The air conduit system 36 also is most preferably provided with various valves, e.g., valves 38, 40, 42, 44 and 46 in order to provide a means for distributing the plant air 34 to various parts of the catalyst addition apparatus 10. The air conduit system 36 is preferably provided with a pressure gauge 48 and pressure gauge 50 for respectively measuring the air pressure outside and inside the weigh hopper 12. In any case, one of the main functions of the plant air 34 is to entrain the catalyst 14 and transfer it to an FCC unit. An air line 52 (especially one provided with a non-return valve 54) carrying plant air stream 34 will most preferably pass under the hopper 12. The bottom of the hopper 12 will be provided with a valve such as a ball valve 56 (preferably one provided with a so-called Thompson valve 58) so that catalyst 14 can be withdrawn from the bottom of the weigh hopper 12 and entrained in the plant air stream 34 when valve 56 is open. The stream of plant air 34 containing the catalyst 14 is then directed to the FCC unit via lines 60 and 62. Line 62 also can be provided with a non-return valve 64 and ball valve 66 as indicated. Line 62 might also be provided with a metering indicator 68 to further check upon the function of the delivery system.

Again, the entrainment of the catalyst 14 into the stream of plant air 34 is preferably controlled by valve 58 which is, in turn, most preferably regulated and monitored by a computer memory and control device 70. Most preferably, the computer memory and control device 70 also will be associated with those mechanical and electrical control and indicator devices normally associated with such processes and equipment in ways which are well known to this art. For example, the memory and control device 70 could be associated with an air supply indicator 72, a valve indicator 74, a manual test button 76, a drain 78, an air supply 79, a remote input 80, a Thompson valve signal 82, a pneumatic control device 84, and an override indicator 86 generally depicted in FIG. 1.

Those skilled in this art also will appreciate that while this invention generally has been described in terms of the general discussions, specific examples drawing and preferred embodiments, none of these should be taken individually as a limitation upon the overall inventive concepts which are set forth in the following claims.

Thus having disclosed my invention, I claim:

1. A method for controlling addition of a catalyst into a fluid catalytic cracking unit (FCC unit) in order to maintain a given concentration of the catalyst in said FCC unit and thereby produce a desired performance from said FCC unit, said method comprising:
   obtaining data concerning the fluid catalytic cracking unit in order to establish:
   (1) an upper concentration limit for the catalyst which is capable of producing the desired performance from the FCC unit,
   (2) a lower concentration limit for the catalyst which is capable of producing the desired performance from the FCC unit,
   (3) a rate of consumption of the catalyst by the FCC unit, and
   (4) an addition rate at which catalyst is introduced into the FCC unit;
   entering the data concerning the FCC unit into a programmed computer in order to determine:
   (1) a basic cycle time for introducing an addition amount of the catalyst into the FCC unit,
   (2) a first period of the basic cycle time wherein the addition amount of the catalyst is introduced into the FCC unit,
   (3) a second period of the basic cycle time wherein the catalyst is not introduced into the FCC unit,
   (4) an addition amount of the catalyst which is capable of raising the concentration of the catalyst from the lower concentration limit to the upper concentration limit and which also is capable of being introduced into the FCC unit during the first period of the basic cycle time, given the addition rate at which catalyst is introduced into the FCC unit,
   placing the FCC unit under control of a computerized control device and thereby:
   (1) operating the FCC unit for a given period of time which contains a series of basic cycle times,
   (2) introducing a nominal addition amount of the catalyst (having a nominal weight) into the FCC unit during the first period of a given basic cycle time by injecting said catalyst into the FCC unit at an addition rate which is between about three times and about ten times the rate of consumption of the catalyst by said FCC unit,
   (3) determining a weight difference between the nominal weight of the nominal addition amount and an actual weight of the catalyst introduced into the FCC unit by weighing a container holding an inventory of the catalyst before and after the nominal addition amount is introduced into the FCC unit,
   (4) sending analog information concerning the weight difference between the nominal weight of the nominal addition amount and the actual weight of the catalyst introduced into the FCC unit as determined by weighing the container holding the inventory of the catalyst to the computerized control device in order to take any needed corrective action with respect to subsequent introduction of the catalyst into the FCC unit.

2. The method of claim 1 wherein the corrective action includes introducing, during a subsequent basic cycle time, an amount of the catalyst which is greater than the nominal addition amount.

3. The method of claim 1 wherein the corrective action includes introducing, during a subsequent basic cycle time, an amount of the catalyst which is less than the nominal addition amount.

4. The method of claim 1 wherein the corrective action includes extending the duration of the first period and shortening the duration of the second period of the given basic cycle time in order to introduce catalyst into the FCC unit during the given basic cycle time in an amount which is greater than the nominal addition amount.

5. The method of claim 1 wherein the corrective action includes returning to use of the nominal addition amount of the catalyst in a basic cycle time subsequent to a basic cycle time in which the corrective action is taken.

6. The method of claim 1 wherein the corrective action includes continued use of an amount of the catalyst which is different from the nominal addition amount in each basic cycle time period remaining in the given period of time.

7. The method of claim 1 wherein the corrective action includes production of an alarm to alert an operator of the FCC unit.

8. The method of claim 1 wherein the catalyst is an $SO_x$ addition catalyst.

9. A method for controlling addition of a catalyst into a fluid catalytic cracking unit (FCC unit) in order to maintain a given concentration of the catalyst in said FCC unit and thereby produce a desired performance from said FCC unit, said method comprising:

obtaining data concerning the fluid catalytic cracking unit in order to establish:
  (1) an upper concentration limit for the catalyst which is capable of producing the desired performance from the FCC unit,
  (2) a lower concentration limit for the catalyst which is capable of producing the desired performance from the FCC unit,
  (3) a rate of consumption of the catalyst by the FCC unit, and
  (4) an addition rate at which catalyst is introduced into the FCC unit;

entering the data concerning the FCC unit into a programmed computer in order to determine:
  (1) a basic cycle time for introducing an addition amount of the catalyst into the FCC unit,
  (2) a first period of the basic cycle time wherein the addition amount of the catalyst is introduced into the FCC unit,
  (3) a second period of the basic cycle time wherein the catalyst is not introduced into the FCC unit,
  (4) an optimal addition amount of the catalyst which is capable of raising the concentration of the catalyst from the lower concentration limit to the upper concentration limit and which also is capable of being introduced into the FCC unit during the first period of the basic cycle time, given the addition rate at which catalyst is introduced into the FCC unit, and
  (5) a non-optimal addition amount of the catalyst which is capable of changing the concentration of the catalyst in the FCC unit in response to an analog signal produced by the FCC unit when said FCC unit does not produce the desired performance through use of the optimal addition amount of the catalyst, placing the FCC unit under control of a computerized control device and thereby:
  (1) operating the FCC unit for a given period of time which contains a series of basic cycle times,
  (2) introducing an optimal addition amount of the catalyst additive into the FCC unit during the first period of a given basic cycle time by injecting said catalyst additive into the FCC unit at an addition rate which is between about three times and about ten times the rate of consumption of the catalyst by said FCC unit,
  (3) determining that an optimal addition amount of the catalyst is, in fact, introduced into the FCC unit during the first period of the given basic cycle time by use of a determination method which includes weighing a container holding an inventory of catalyst additive before and after said catalyst is introduced into the FCC unit,
  (4) sending analog information obtained by weighing the container holding the inventory of catalyst additive to the computerized control device in order to evaluate corrective action with respect to subsequent introduction of catalyst additive into the FCC unit, and
  (5) taking corrective action by a procedure wherein a non-optimal addition amount of the catalyst is introduced into the FCC unit during a subsequent basic cycle time by virtue of the fact that an analog signal produced by the FCC unit causes the computerized control device to substitute use of the optimal addition amount of the catalyst with the use of the non-optimal addition amount of the catalyst.

10. The method of claim 9 wherein the corrective action includes introducing, during more than one subsequent basic cycle time, a non-optimal addition amount of the catalyst which is greater than the optimal addition amount.

11. The method of claim 9 wherein the corrective action includes introducing, during more than one subsequent basic cycle time, a non-optimal addition amount of the catalyst additive which is less than the optimal addition amount.

12. The method of claim 9 wherein the corrective action includes extending the duration of the first period and shortening the duration of the second period of more than one subsequent basic cycle time.

13. The method of claim 9 wherein the corrective action includes returning to use of the optimal addition amount of the catalyst in a basic cycle time subsequent to a basic cycle time in which the corrective action is taken.

14. The method of claim 9 wherein the corrective action includes continued use of an amount of the catalyst which is different from the optimal addition amount in each basic cycle time period remaining in the given period of time.

15. The method of claim 9 wherein the corrective action includes production of an alarm to alert an operator of the FCC unit.

16. The method of claim 9 wherein the catalyst is an $SO_x$ addition catalyst.

17. A method for controlling addition of a catalyst into a fluid catalytic cracking unit (FCC unit) in order to maintain a given concentration of the catalyst in said FCC unit and thereby produce a desired performance from said FCC unit, said method comprising:

obtaining data concerning the fluid catalytic cracking unit in order to establish:
  (1) an upper concentration limit for the catalyst which is capable of producing the desired performance from the FCC unit,
  (2) a lower concentration limit for the catalyst which is capable of producing the desired performance from the FCC unit,
  (3) a rate of consumption of the catalyst by the FCC unit, and
  (4) an addition rate at which catalyst is introduced into the FCC unit;

entering the data concerning the FCC unit into a programmed computer in order to determine:
  (1) a basic cycle time for introducing an addition amount of the catalyst into the FCC unit,
  (2) a first period of the basic cycle time wherein the addition amount of the catalyst is introduced into the FCC unit,
  (3) a second period of the basic cycle time wherein the catalyst is not introduced into the FCC unit,
  (4) an optimal addition amount of the catalyst which is capable of raising the concentration of the catalyst from the lower concentration limit to the upper concentration limit and which also is capable of being introduced into the FCC unit during the first period of the basic cycle time, given the addition rate at which catalyst is introduced into the FCC unit, and (5) a non-optimal addition amount of the catalyst which is capable of changing the concentration of the catalyst in the FCC unit in response to an analog signal produced by the FCC unit when said unit does not produce the desired performance through use of the optimal addition amount of the catalyst, placing the FCC unit under control of a computerized control device and thereby:

(1) operating the FCC unit for a given period of time which contains a series of basic cycle times, (2) introducing an optimal addition amount of the catalyst (having a nominal weight) into the FCC unit during the first period of a given basic cycle time by injecting said catalyst additive into the FCC unit at an addition rate which is between about three times and about ten times the rate of consumption of the catalyst additive by said FCC unit, (3) determining a weight difference between the nominal weight of the optimal addition amount and an actual weight of the catalyst introduced into the FCC unit by weighing a container holding an inventory of the catalyst additive before and after the optimal addition amount is introduced into the FCC unit, (4) sending analog information concerning a weight difference between the nominal weight of the optimal addition amount and the actual weight of the catalyst additive introduced into the FCC unit to the computerized control device in order to evaluate corrective action with respect to subsequent introduction of catalyst additive into the FCC unit, and (5) taking corrective action by a procedure wherein a non-optimal addition amount of the catalyst is introduced into the FCC unit during a subsequent basic cycle time by virtue of the fact that an analog signal produced by the FCC unit causes the computerized control device to substitute use of the optimal addition amount of the catalyst with use of the non-optimal addition amount of the catalyst.

18. The method of claim 17 wherein the corrective action includes introducing, during more than one subsequent basic cycle time, a non-optimal amount of the catalyst which is greater than the optimal addition amount.

19. The method of claim 17 wherein the corrective action includes introducing, during more than one subsequent basic cycle time, a non-optimal amount of the catalyst which is less than the optimal addition amount.

20. The method of claim 17 wherein the corrective action includes extending the duration of the first period and shortening the duration of the second period of a series of basic cycle times.

21. The method of claim 17 wherein the corrective action includes returning to use of the optimal addition amount of the catalyst in a basic cycle time subsequent to a basic cycle time in which the corrective action is taken.

22. The method of claim 17 wherein the corrective action includes continued use of an amount of the catalyst which is different from the optimal addition amount in each basic cycle time period remaining in the given period of time.

23. The method of claim 17 wherein the corrective action includes production of an alarm to alert an operator of the FCC unit.

24. The method of claim 17 wherein the catalyst is an $SO_x$ addition catalyst.

* * * * *